US011677770B2

(12) United States Patent
Baldini Das Neves et al.

(10) Patent No.: US 11,677,770 B2
(45) Date of Patent: Jun. 13, 2023

(54) DATA RETRIEVAL FOR ANOMALY DETECTION

(71) Applicant: International Business Machines Corporation, Armonk, NY (US)

(72) Inventors: Rogerio Baldini Das Neves, Belo Horizonte (BR); Fernando Padia Junior, Sao Paulo (BR); Fabio Luis Marras, Vinhedo (BR); Antonio Fernando Gaspar Santos, Santos (BR); Marco Aurelio Stelmar Netto, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 17/249,940

(22) Filed: Mar. 19, 2021

(65) Prior Publication Data
US 2022/0303291 A1    Sep. 22, 2022

(51) Int. Cl.
*H04L 9/40* (2022.01)
*G06N 20/00* (2019.01)

(52) U.S. Cl.
CPC ......... *H04L 63/1425* (2013.01); *G06N 20/00* (2019.01); *H04L 63/1416* (2013.01)

(58) Field of Classification Search
CPC .. H04L 63/1425; H04L 63/1416; G06N 20/00
USPC ........................................................ 726/23
See application file for complete search history.

(56) References Cited

U.S. PATENT DOCUMENTS

| 8,607,353 | B2 | 12/2013 | Rippert, Jr. |
| 8,966,624 | B2* | 2/2015 | Sallam ................... G06F 21/564 726/22 |
| 9,697,355 | B1 | 7/2017 | Park |
| 10,185,832 | B2 | 1/2019 | Cam |
| 10,210,470 | B2 | 2/2019 | Datta Ray |
| 10,372,910 | B2 | 8/2019 | Martin |
| 10,498,756 | B2* | 12/2019 | Yampolskiy .......... H04W 84/12 |
| 10,505,972 | B2* | 12/2019 | Thomas .............. H04L 63/1441 |
| 10,742,676 | B2* | 8/2020 | Mahaffey ............ H04W 12/128 |
| 2014/0137257 | A1* | 5/2014 | Martinez ............. H04L 63/1433 726/25 |

(Continued)

FOREIGN PATENT DOCUMENTS

DE    102017112042 A1    12/2017

OTHER PUBLICATIONS

Cui, Bingfeng, "Electric device abnormal detection based on IoT and knowledge graph", 2019 IEEE International Conference on Energy Internet (ICEI), 4 pages.

(Continued)

*Primary Examiner* — Badri Narayanan Champakesan
(74) *Attorney, Agent, or Firm* — Stephen R. Yoder

(57) ABSTRACT

Data retrieval from connected devices for a data-driven anomaly detection system while complying with performance and/or availability requirements of services that rely on operation of the connected devices. Determining the amount of data, type of data, and retrieval frequency for detecting performance anomalies for each connected device that is relied upon by services so as to maintain required performance and/or availability to the service. The required parameters being the subject of an SLA for the service or the connected devices, such as IoT devices.

18 Claims, 8 Drawing Sheets

(56) References Cited

U.S. PATENT DOCUMENTS

| | | | |
|---|---|---|---|
| 2016/0036837 A1* | 2/2016 | Jain | H04L 63/1416 726/23 |
| 2017/0126712 A1 | 5/2017 | Crabtree | |
| 2018/0284756 A1* | 10/2018 | Celia | B62D 15/0215 |
| 2022/0107802 A1* | 4/2022 | Rao | G06F 16/907 |

OTHER PUBLICATIONS

Dolan et al., "Proactively Extracting IoT Device Capabilities: An Application to Smart Homes", © IFIP International Federation for Information Processing 2020 Published by Springer Nature Switzerland AG 2020, A. Singhal and J. Vaidya (Eds.): DBSec2020, LNCS 12122, pp. 42-63, 2020, 22 pages.

Luo et al., "Anomaly Detection Based Latency-Aware Energy Consumption Optimization for IoT Data-Flow Services", Sensors 2020, MDPI, Published: Dec. 24, 2019, 20 pages.

Mell et al., "The NIST Definition of Cloud Computing", National Institute of Standards and Technology, Special Publication 800-145, Sep. 2011, 7 pages.

Nguyen et al., "DIOT: A Federated Self-learning Anomaly Detection System for IoT", Paper accepted to the 39th IEEE International Conference on Distributed Computing Systems (ICDCS 2019), arXiv:1804.07474v5 [cs.CR] May 10, 2019, 12 pages.

Sedjelmaci et al., "A Lightweight Anomaly Detection Technique for Low-Resource IoT Devices: A Game-Theoretic Methodology", IEEE ICC 2016—Mobile and Wireless Networking Symposium, 6 pages.

Summerville et al., "Ultra-Lightweight Deep Packet Anomaly Detection for Internet of Things Devices", © 2015 IEEE, 8 pages.

Timcenko et al., "Machine Learning based Network Anomaly Detection for IoT environments", School of Electrical Engineering, Belgrade, Serbia, printed on Feb. 11, 2021, 6 pages.

Ukil et al., "IoT Healthcare Analytics: The Importance of Anomaly Detection", 2016 IEEE 30th International Conference on Advanced Information Networking and Applications, 4 pages.

* cited by examiner

DATA RETRIEVAL FOR ANOMALY DETECTION

BACKGROUND

The present invention relates generally to the field of security monitoring, and more particularly to data retrieval from connected devices for anomaly detection systems.

Fifth generation (5G) and edge computing technologies demand extensive and broad use of connected devices including internet-of-things (IoT) devices. Attack and anomaly detection, referred to herein as anomaly detection, in IoT devices is becoming increasingly important as the use of IoT devices gains popularity. Anomaly detection systems are deployed to detect when an IoT system is attacked or is vulnerable to attack. Anomaly detection systems often use artificial intelligence, intrusion systems, and/or monitoring systems for anomaly detection.

A service-level agreement (SLA) is a commitment between a service provider and a client. Particular aspects of the service such as quality, availability, and responsibilities of the various parties are agreed upon as part of a contract for provision of services. Edge computing is regarded as the extension of cloud computing services to the network edge. A cloud SLA is an agreement between a cloud service provider and a customer that ensures a minimum level of service is maintained. A cloud infrastructure can span geographies, networks and systems that are both physical and virtual. Oftentimes an SLA will guarantee certain levels of reliability, availability, and responsiveness to systems and applications.

SUMMARY

In one aspect of the present invention, a method, a computer program product, and a system includes: identifying a set of devices in a knowledge base, the set of devices having a same characteristic as a first device, the first device being a network-connected device transmitting data to a client device; defining an amount of data to retrieve from the first device for use by an anomaly detection system based on a set of performance requirements of the first device and usage data of the set of devices; defining a frequency for retrieving the amount of data from the first device based on a set of performance requirements of the first device and usage data of the set of devices; monitoring for compliance of the first device to the set of performance requirements while transmitting data to the client device while the first device operates according to the defined frequency of data retrieval and the defined amount of data to be retrieved for the anomaly detection system; and responsive to compliance to the set of performance requirements being detected, recording to the knowledge base the first device, characteristics of the first device including the same characteristic, the amount of data, and the frequency of data retrieval to a knowledge base.

In another aspect of the present invention, a method, a computer program product, and a system includes: establishing a support-vector machines (SVM) model using tiers-of-data labels representing amounts of data to be retrieved; and determining the tier of data the first device according to the SVM model. The tier of data is the amount of data to be retrieved from the first device.

In yet another aspect of the present invention, a method, a computer program product, and a system includes: executing a machine learning model for the first device to define a frequency of data retrieval as a compromise among performance indicators. The initial frequency is pre-defined. The machine learning model operates to check detected behaviors of the first device during operation against historic records for the set of devices in the knowledge base.

In still yet another aspect of the present invention, a method, a computer program product, and a system includes: updating a knowledge graph by associating the first device with the set of devices based on the first device and the set of devices having the same characteristic. The knowledge graph includes device information stored in the knowledge base.

DETAILED DESCRIPTION

Figure 1:
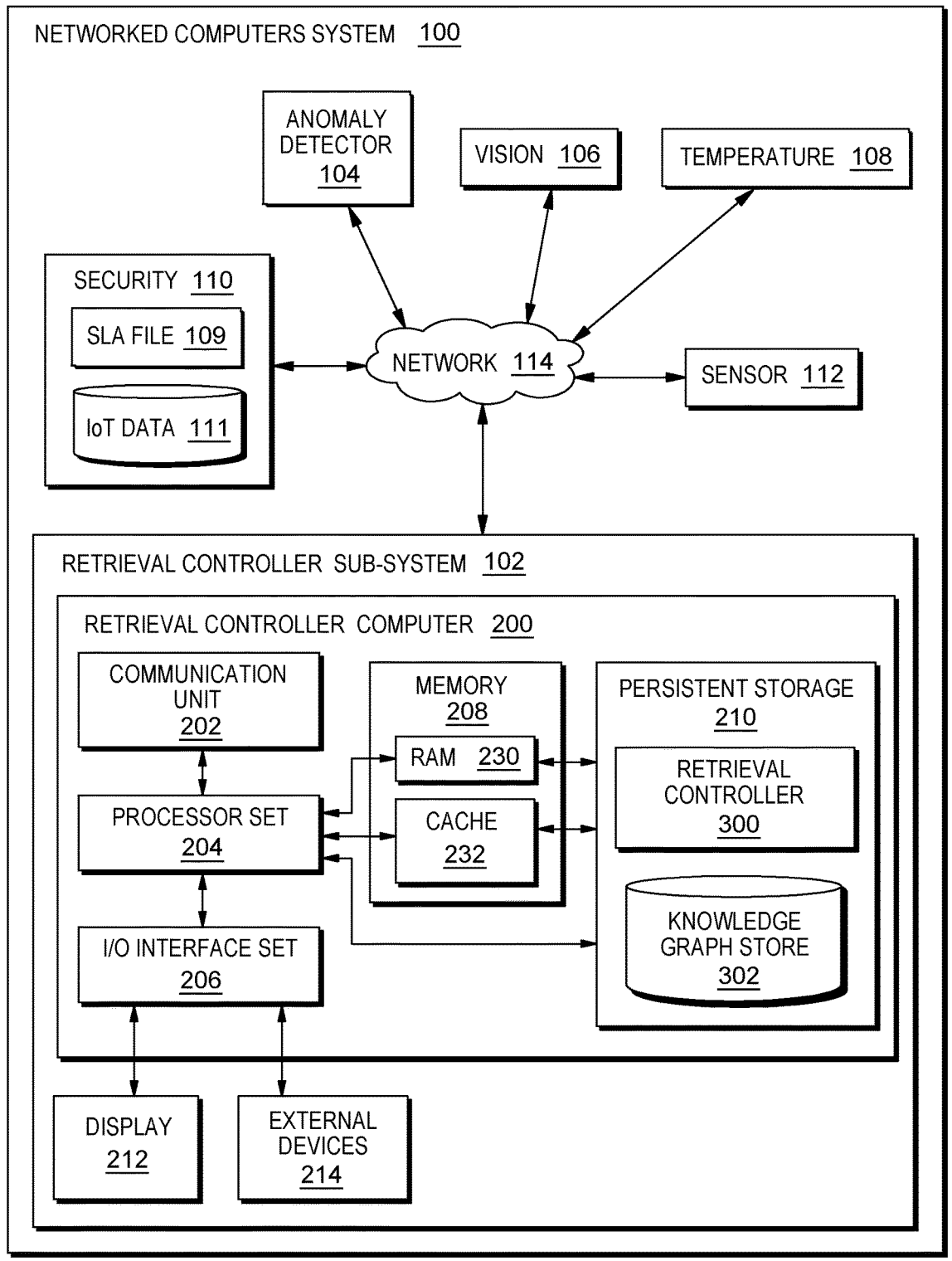
FIG. 1 is a schematic view of a first embodiment of a system according to the present invention.

Data retrieval from connected devices for a data-driven anomaly detection system while complying with performance and/or availability requirements of services that rely on operation of the connected devices. Determining the amount of data, type of data, and retrieval frequency for detecting performance anomalies for each connected device that is relied upon by services so as to maintain required performance and/or availability to the service. The required parameters being the subject of an SLA for the service or the connected device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: data retrieval control sub-system 102; anomaly detector sub-system 104; vision sub-system 106; temperature sub-system 108; security sub-system 110; service level agreement file 109; internet of things (IoT) data store 111; sensor sub-system 112; communication network 114; data retrieval control computer 200; communication unit 202; processor set 204; input/output (I/O) interface set 206; memory device 208; persistent storage device 210; display device 212; external device set 214; random access memory (RAM) devices 230; cache memory device 232; data retrieval controller 300; and knowledge graph store 302.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Data retrieval program 300 operates to provide a data-driven anomaly detection system with IoT device data while complying with performance and/or availability requirements of services that rely on operation of the IoT devices. Determining the amount of data, type of data, and retrieval frequency for detecting performance anomalies for each IoT device that is relied upon by services so as to maintain required performance and/or availability to the service. The required parameters being the subject of an SLA for the service or the device.

Some embodiments of the present invention are directed to a process for retrieving data from IoT devices for anomaly detection that includes identifying specific characteristics of each IoT device and determining what type and amount of data should be captured as well as the frequency for capturing the data.

IoT devices that provide data in support of client systems and applications are often required to perform according to an SLA. Many SLA or cloud SLA cover areas including: (i) volume and quality of work (including precision and accuracy); (ii) speed; (iii) responsiveness; and (iv) efficiency.

Some embodiments of the present invention recognize the following facts, potential problems and/or potential areas for improvement with respect to the current state of the art: (i) early detection of IoT device anomalies is an important goal for the industry; (ii) conventional anomaly detection systems ensure proper detection of anomalies by using machine learning techniques that depend on large amounts of high-quality data from the IoT devices; (iii) improper retrieval of data for anomaly detection can negatively affect an IoT device and its environment; (iv) IoT devices have limitations in terms of data transfer bandwidth/latency, battery capability, and computing power; and/or (v) when too much data is retrieved from an IoT device for anomaly detection, the functionality and/or lifespan of the IoT device can be reduced.

Some embodiments of the present invention are directed to a data retrieval controller to support IoT anomaly detection systems while maintaining resource performance and availability of the IoT device according to a service level agreement (SLA).

Some embodiments of the present invention use IoT device limitations and features in conjunction with contextual usage of the devices to determine target frequencies of data retrieval and target quantities of data to be retrieved for anomaly detection in IoT devices. IoT device limitations may include: (i) data transfer bandwidth; (ii) data transfer latency; (iii) battery capacity; and (iv) computing power. According to some embodiments of the present invention, the target collection frequency and quantity is determined by a combination of supervised machine learning techniques and reinforcement learning techniques. The use of unsupervised machine learning and a knowledge graph to allow multiple devices sharing similar features and deployment environments to accelerate training on the amount and frequency of data retrieval from a specified IoT device.

Some embodiments of the present invention are directed to a designed data retrieval solution that considers the specific characteristics of IoT devices and their limitations to create an appropriate data retrieval approach that specifies which data should be captured and the frequency of the data capture process.

Figure 2:
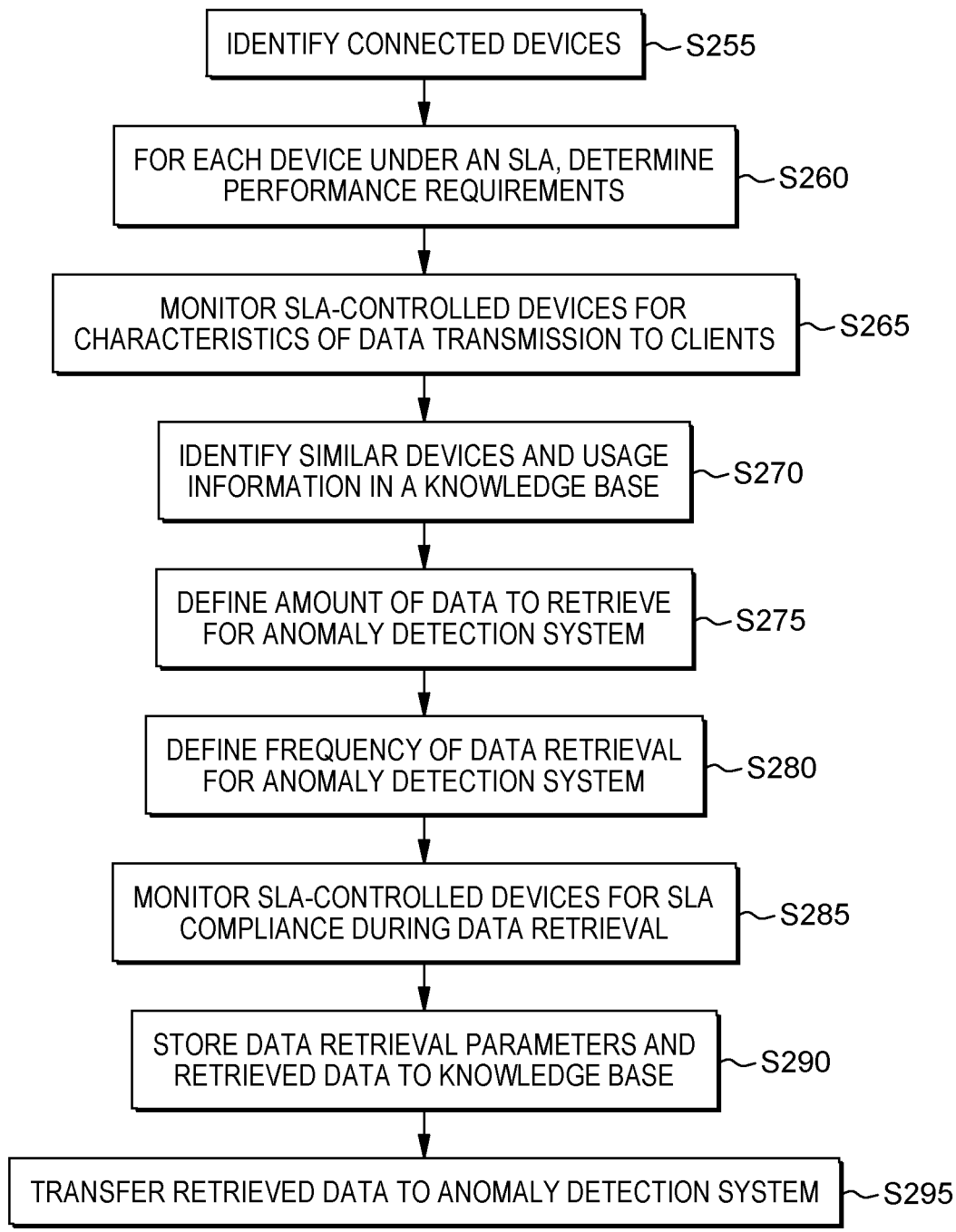
FIG. 2 is a flowchart showing a method performed, at least in part, by the first embodiment system.
Figure 3:
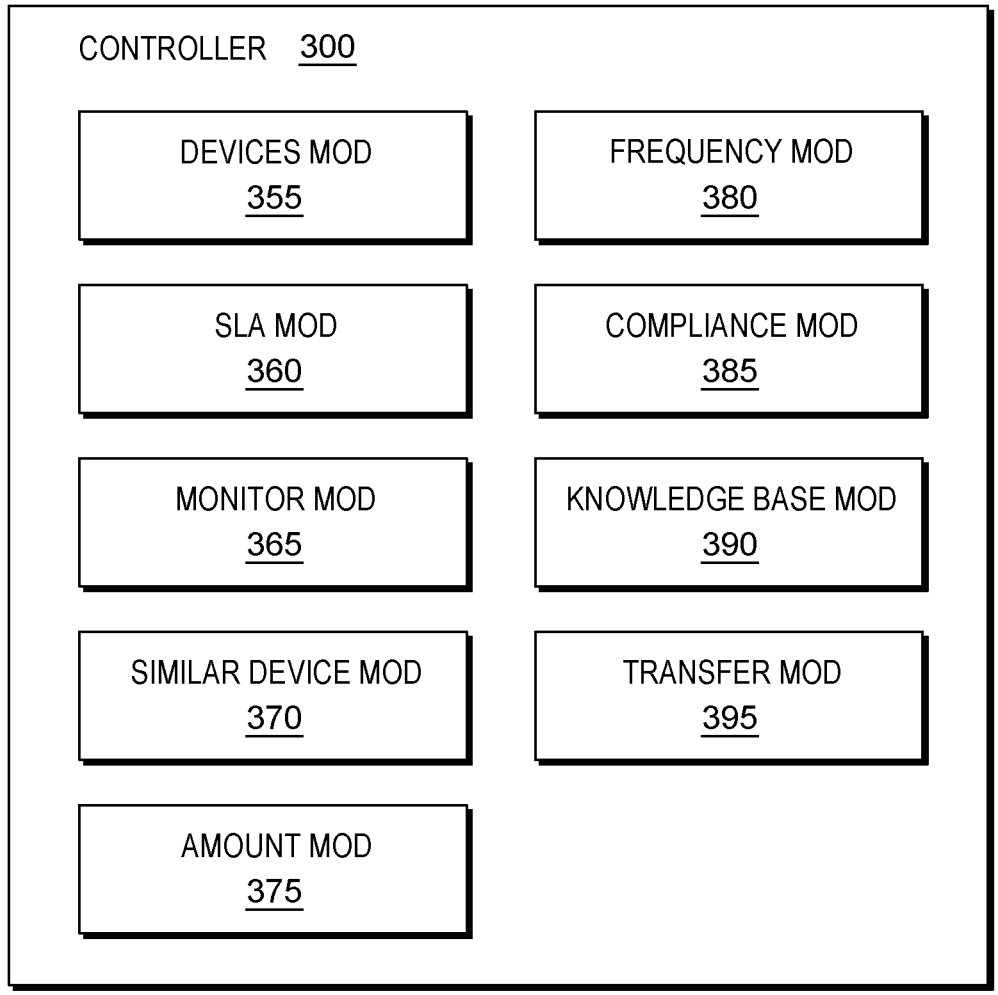
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where devices module ("mod") 355 identifies connected devices. The connected devices are specifically internet-of-things (IoT) devices such as cameras, thermometers, thermocouples, and other sensors connected over a network to one or more applications or services. Examples provided herein include a local network, networked computers system such as system 100 of FIG. 1, and cloud computing environment 50.

Processing proceeds to step S260, where service level agreement (SLA) mod 360, for each device under an SLA, determines performance requirements. In this example, SLA file 109 includes specific performance requirements for operation of the security sub-system 110 provide security as a service that relies upon connected devices in vision sub-system 106 and temperature sub-system 108. Disclosed performance requirements correspond to two of the three device sub-systems 106, 108, and 112 because device 112 is not controlled by an SLA. Alternatively, each device and corresponding performance requirements are provided by a user or stored in database for reference during performance of various processes disclosed herein. Performance requirements address the scope, nature, and quality of service provided.

Quality of service requirements include: (i) availability; (ii) reliability; (iii) data processing capacity; (iv) data processing rate; (v) response time; and/or (vi) power saving.

Processing proceeds to step S265, where monitor mod 365 monitors SLA-controlled devices for characteristics of data transmission to clients. In this example, the quality of data transmission from vision sub-system 106 and temperature sub-system 108 to security sub-system is controlled by one or more SLAs. Performance of the connected devices and corresponding security sub-system are observed during data transmission periods.

Processing proceeds to step S270, where similar device mod 370 identifies similar devices and corresponding usage information in a knowledge base. In this disclosure, the reference to similar devices refers to a matching characteristic that is a target characteristic of the various devices. Oftentimes, there are multiple target characteristics, each of which are to match for a determination of "similar" among devices. According to some embodiments of the present invention, a knowledge graph displays or provides a set of "similar devices" on the basis that target characteristics are considered. The knowledge graph may display devices differently according to whether one target characteristic matches or two target characteristics match among a set of devices. Characteristics of interest may include, but are not limited to: (i) function; (ii) model number; (iii) type of data collected; (iv) associated service to which collected data is provided; (v) device feature; (vi) deployment environment; (vii) component(s) of a deployment environment; (viii) usage context; (ix) device version; (x) hardware version; (xi) software/firmware version; (xii) device capabilities; (xiii) device limitations; (xiv) data transfer bandwidth/latency; (xv) battery capability or capacity; (xv) computing power; and (xvi) device date of manufacture.

Processing proceeds to step S275, where amount mod 375 defines an amount of data to retrieve for anomaly detection system. The amount of data may be defined as what types of data to transmit, such as how many different types of measurements will be taken. The amount of data to transmit may be defined as the total bytes of data to be transmitted during each transmission cycle. Some data is measure by bytes per measure such that if a device provides three different measures at 4 bytes per measure, the amount of data may be defined as 12 bytes per transmission. Some devices store collected data until the data is retrieved from device storage.

According to some embodiments of the present invention, the anomaly detection system operates on a specified minimum amount of data for analyzing anomalies. In such cases, the starting point for amount of data is defined by the detection system. The amount mod operates to define amounts of data at or above the specified minimum in view of performance of a data-receiving service associated with the connected device.

Processing proceeds to step S280, where frequency mod 380 defines a frequency of data retrieval for anomaly detection system. Similar to how the amount of data to be retrieved is based on the capabilities of the device and corresponding service, the frequency of data retrieval is also dependent upon the capability of the device in question and throughput of the anomaly detection system. In some examples, relatively infrequent retrieval of data results in relatively larger amounts of data retrieved. Especially, when the device in question stores collected data for later retrieval. During retrieval of data, the device may not perform as required by the associated service. Defining the frequency of data retrieval considers the potential adverse effect of data collection on SLA compliance.

Processing proceeds to step S285, where compliance mod 385 monitors SLA-controlled devices for SLA compliance during data retrieval. During collection at the specified minimum rate, the affected service is monitored for compliance to SLA requirements. Defined retrieval rates and amounts are redetermined when non-compliant performance is detected.

Processing proceeds to step S290, where knowledge base mod 390 stores data retrieval parameters and retrieved data to knowledge base. When defined process parameters are established, the device information is stored in the knowledge base along with the process parameters and environmental data for later reference when setting up other devices to operate with anomaly detection systems.

Processing ends at step S295, where transfer mod 395 transfers retrieved data to anomaly detection system. Retrieved data is provided as input the anomaly detection system. In that way anomaly detection is performed without effecting the related services and compliance to corresponding SLAs.

Further embodiments of the present invention are discussed in the paragraphs that follow along with reference to FIGS. 4-7.

Some embodiments of the present invention are directed to leveraging characteristics, contextual usage, features, and limitations of IoT devices when determining an amount of data to collect and a collection frequency for anomaly detection during operation of the IoT devices.

Some embodiments of the present invention are directed to adjusting data retrieval using a combination of supervised machine learning and reinforcement learning including a feedback loop of SLA metrics for a given IoT device and an anomaly detection system. The data retrieval adjustments effecting amount and/or frequency of data retrieval.

Some embodiments of the present invention are directed to identifying performance patterns by a data retrieval controller using unsupervised machine learning and inputting the patterns into a knowledge graph using a similarity index to cluster similar devices and usage contexts on the graph.

Some embodiments of the present invention are directed to a computing system including IoT devices, an anomaly detection sub-system, computing infrastructure whether via cloud services or a computer sub-system, and a data retrieval controller including various modules for managing data retrieval from IoT devices for anomaly detection.

In one example, the IoT devices are computing devices that perform tasks such as temperature analyzer or image capture that generally have a low-resource demand. The anomaly detection system detects an anomaly in the IoT environment. The computing infrastructure includes computing resources to store a knowledge graph, a set of IoT models, and any necessary information for the data retrieval controller to access data from the IoT devices. The computing infrastructure may be a cloud computing environment or an on-premise set of computing resources such as one having a local server. The data retrieval controller, according to some embodiments of the present invention, relies on four modules: (i) device metrics analyzer; (ii) anomaly detection analyzer; (iii) data retrieval adjustment manager; and (iv) knowledge graph manager.

The device metrics analyzer determines if the IoT devices are performing according to a pre-defined service level agreement (SLA) while capturing data for the anomaly detection system. The anomaly detection analyzer monitors the function of anomaly detection services or systems to determine if the frequency of data collection, amount of data collected, and/or types of data collected meets the demand of the anomaly detection systems. The data retrieval adjustment manager operates to adjust the frequency of data collection, amount of data collected, and/or types of data collected according to configuration updates driven by supervised machine learning techniques and reinforcement learning techniques that determine how such configurations should be updated. The knowledge graph manager facilitates reuse of the learned data collection configurations for various IoT devices and/or data collection contexts.

Figure 4:
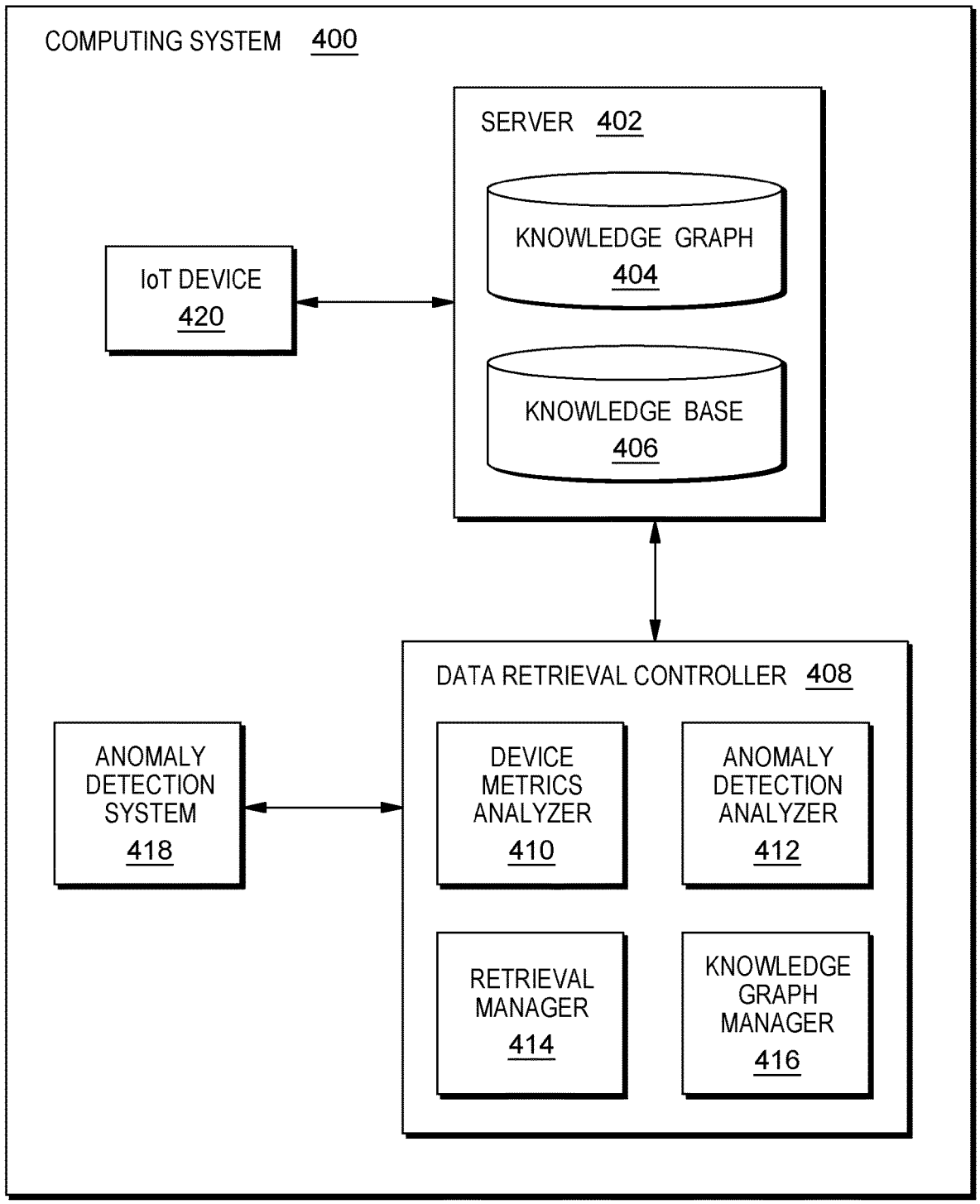
FIG. 4 is a schematic view of a second embodiment of a system according to the present invention.

Some embodiments of the present invention will now be described in detail with reference to FIGS. 4 and 5. FIG. 4 is a functional block diagram illustrating various portions of computing system 400, in accordance with one embodiment of the present invention, including: data retrieval server sub-system 402; knowledge graph folder 404; knowledge base 406; data retrieval controller 408; device metrics analyzer 410; anomaly detection analyzer 412; retrieval manager 414; knowledge graph manager 416; anomaly detection sub-system 418; and internet of things (IoT) device sub-system 420.

Figure 5:
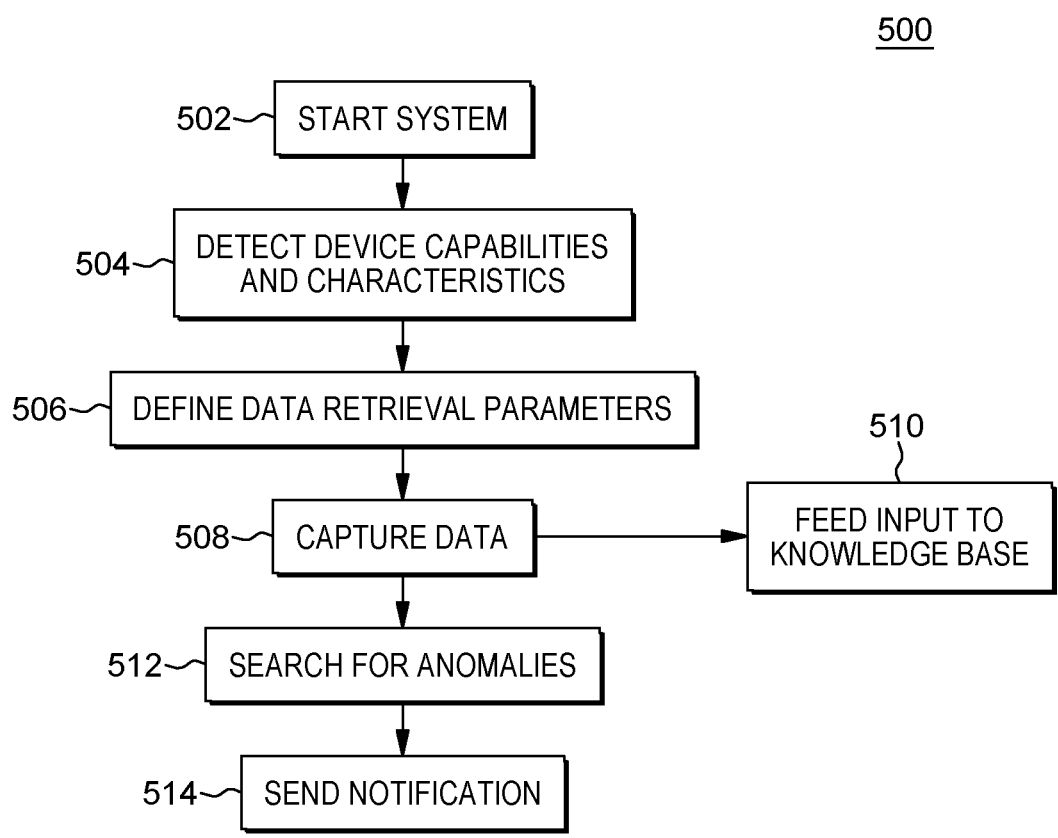
FIG. 5 is a flowchart showing a first method performed, at least in part, by the second embodiment system.

FIG. 5 shows flowchart 500 depicting a second method according to the present invention. FIG. 4 shows computing system 400 for performing at least some of the method steps of flowchart 500. This method and associated software/hardware will now be discussed, over the course of the following paragraphs, with extensive reference to FIG. 5 (for the method step blocks) and FIG. 4 (for the computing system).

According to one example of the process, the data retrieval control begins automatically upon start of the anomaly detection system for autonomous and continuous execution (step 502) so long as the anomaly detection system is active.

Processing proceeds to step 504, where the system automatically detects IoT device capabilities and characteristics. An external device-agnostic system obtains configuration information of the various IoT devices via conventional protocols. The IoT devices, such as IoT device 420 are equipped with processing and memory capabilities having embedded software connected to a network and capable of generating information for an external management system based on standards protocols such as OPC, SNMP, and MIB II.

After identifying the IoT device, the system determines a candidate data model based on the type of IoT device. In this example, data models are stored in knowledge graph store 404 (FIG. 4). In this example, the candidate data model is determined by analysis of only the metadata of the device. Alternatively, operational information is collected during operation of the device. When operational information is not collected, at least the type of data generated by the device is collected and analyzed.

Processing proceeds to step 506, where the system defines a frequency of data collection and an amount of data to be captured for a given period of time. The system uses two different machine leaning algorithms to define the amount of data needed to identify a potential anomaly and the needed data collection frequency. By doing this, the system is able to minimize the impact of data retrieval on the device. To determine the amount of data a supervised machine learning algorithm (SVM) is used. To determine the data retrieval frequency a reinforcement learning algorithm is used. Defining the frequency of data collection and the amount of data to be captured is performed at startup and also whenever events occur that are related to any data capture activity. Events such as detection of an anomaly or a newly added IoT device would prompt a reevaluation of the frequency of collection and amount of data to be captured.

According to some embodiments of the present invention, a supervised machine learning algorithm SVM predicts the amount of data to be captured from a given IoT device. Further, in some embodiments, a reinforcement learning algorithm predicts the capture frequency for the IoT device.

Processing proceeds to step 508, where the system captures IoT device data. In this step, based on the defined parameters (amount of data) and frequency of collection/retrieval, the collected data is read into the system. The data is sent for analysis and stored in knowledge base 406 in the step that follows (step 510) so that a continuous learning mechanism is able to interpret the collected data and make a decision regarding relevance of the various data points that were collected. It should be noted that the knowledge base is initially provide setup information inputs including device-specific data for various devices and performance details including contextual data and environmental data. Step 508 is performed as many times as necessary according to the amount of data and retrieval frequency defined in earlier steps. In this way, the knowledge base is provided with an updated knowledge graph as well as the captured, or retrieved, data.

Processing proceeds to step 510, where the system assumes a machine learning (ML) model is in place. The ML model will evolve in an iterative way as data is analyzed. To create the ML model, some embodiments of the present invention use unsupervised machine learning training such as K-means. Training according to K-means requires a set of features for creating the ML model. In this case, the following features can be used by extracting information from knowledge base 406 (FIG. 4). An objective of the model is to cluster various IoT devices based on their available characteristics (metadata) as well as collected data for each metric available. The clustering outcome is generated as a knowledge graph. which is stored in knowledge graph store 404. The knowledge graph establishes relationship levels among the various devices based on device type and device behavior.

It should be noted that some embodiments of the present invention cluster devices by characteristics, behaviors, and context using an unsupervised machine learning algorithm such as K-means.

Processing proceeds to step 512, where the system processes retrieved data and searches for eventual anomalies by analysis and prediction. Based on the captured and stored data, anomaly analysis techniques are employed including analysis of events related to safety and inadequate or incoherent functioning of devices. If an anomaly is detected, the information is stored in the data repository so that it can be used in the learning mechanism during subsequent execution.

Processing proceeds to step 514, where the system sends a notification of the detected anomaly. If an anomaly is detected in the data read from a device, the system sends the information to external specialized systems for proper event handling.

Figure 6:
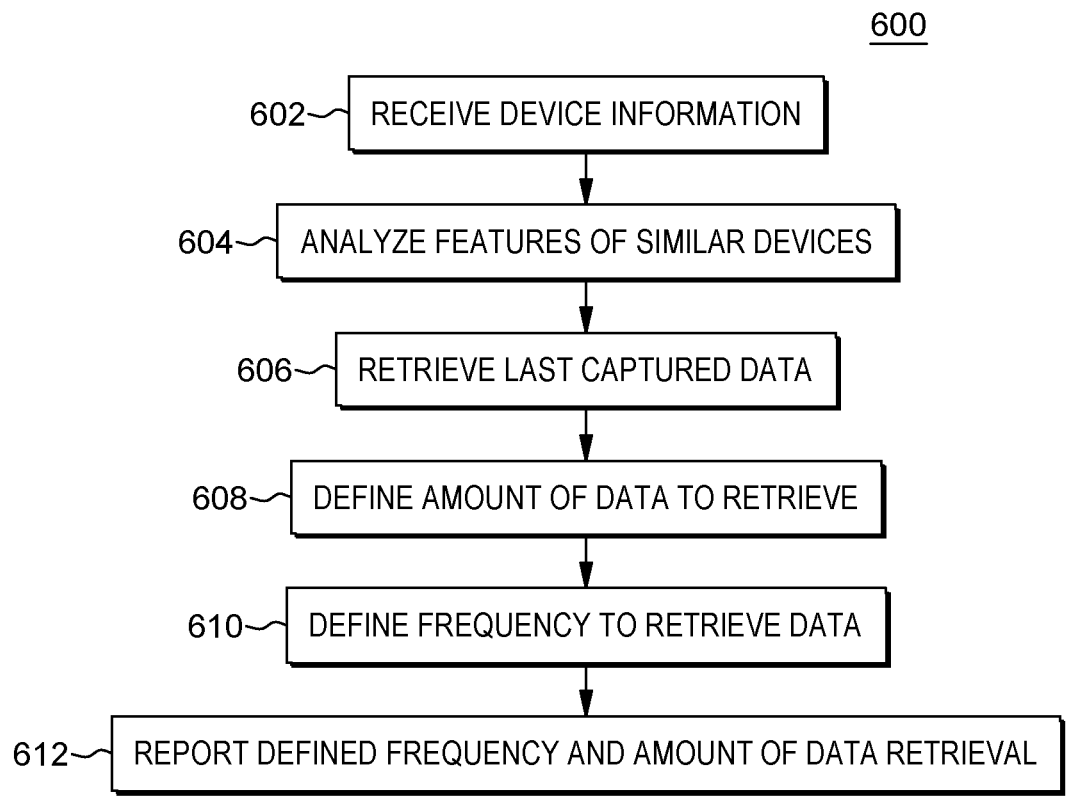
FIG. 6 is a flowchart showing a second method performed, at least in part, by the second embodiment system.

Some embodiments of the present invention will now be described in detail with reference to FIG. 6, which shows flowchart 600 depicting a third method according to the present invention. FIG. 4 shows computing system 400 for performing at least some of the method steps of flowchart 600. This method and associated software/hardware will now be discussed, over the course of the following paragraphs, with extensive reference to FIG. 6 (for the method step blocks) and FIG. 4 (for the computing system).

Some embodiments of the present invention are directed to a process to determine data retrieval parameters that are defined at step 506, above. In this example, the data retrieval parameters are the amount of data and the type of data to be retrieved from the IoT devices, such as IoT device 420. The following steps are included in an example process for determining the amount of data and the type of data to be retrieved.

Processing begins at step 602, where the system receives IoT device information. In this step, all metadata information from the IoT device under analysis are received. In this example, the metadata information includes: (i) device metadata (name, model, version, ID number, hardware version, software/firmware version); (ii) device data model (data structure of information provided by device); and (iii) device capabilities.

Processing proceeds to step 604, where the system analyzes features of similar devices previously deployed that share similar features and/or deployment environments as the current IoT device and environment. Based on the characteristics of the device under analysis obtained in step 602 and compared to those characteristics of similar devices stored in the knowledge base repository, the system analyzes the information collected as clusters of devices and identifies relevant information for the steps that follow. Relevant information is retrieved from the knowledge database and is stored in the form of a knowledge graph prepared at step 510 where devices are clustered using a K-means algorithm.

Some embodiments of the present invention perform step 604 in part by retrieving from the knowledge base data related to other devices having a same feature, characteristics, or otherwise supporting a conclusion that the other device is similar to a device in question. Device information is stored in the form of clusters of similar devices to facilitate selection of similar devices. As discussed in step 510 (FIG. 5), a k-means algorithm is used to assigned devices to clusters. Further, the information collected for the device in question is compared to the information obtained from the knowledge base that corresponds to a cluster of similar devices. Relevant information is aggregated and applied to the steps that follow where amounts of data and frequency of retrieval are addressed.

Processing proceeds to step 606, where the system retrieves last-captured data, historical captured data, SME configuration, and/or anomalies previously detected in the device under analysis. In this example, the system retrieves the data, last captured data, historical data, SME configuration, and historical anomalies. The retrieved data includes, but is not limited to device limitations, data transfer bandwidth. data transfer latency, battery capacity, battery capability, computing power, device date of installation/manufacture, and contextual usage.

Processing proceeds to step 608, where the system executes ML model to define the amount of data to be retrieved from the IoT device under analysis. Some embodiments of the present invention rely on having an ML model that is trained beforehand. In practice, the ML model is trained using a database of IoT devices including a device similar to the device(s) under analysis. The training may occur at various time intervals such as once a day or once a week. To create the ML model, one possible embodiment is to use supervised machine learning training such as support vector machine (SVM) training.

The SVM training technique requires a set of features and labels. It may be created according to the method that follows: (i) gather information of all similar devices to use as feature of the ML training; (ii) Use Labels (such as Tier 1, Tier 2, Tier 3) of the SVM Training; and (iii) after running the SVM training, an ML model is available that is based on the device characteristics, capabilities, health metrics to support determination of the tiers of data (amount) to be captured in a next iteration of anomaly detection.

The step of gathering information of all similar devices to use as feature of the ML training may include the following information: (i) device metadata (name, model, version, identification number, hardware version, software/firmware version); (ii) device capabilities; (iii) data (information itself); (iv) device limitations, data transfer bandwidth/latency, battery capability or capacity, computing power, device date, and contextual usage; and (v) eventual anomalies.

The step of using labels (such as Tier 1, Tier 2, Tier 3) of the SVM Training requires pre-defined tiers by an SME beforehand. The tiers present the amount of data (columns) in groups, for example, as follows: Tier 1: Basic columns of data; Tier 2: Intermediate columns of data; and Tier 3: Complete columns of data.

In this example, the tier 1 basic columns of data represent basic information that must be gathered from the IoT device every time it is analyzed. Basic information includes health information such as memory user, processor performance, and battery capacity along with important information received from sensors. The tier 2 intermediate information represents information that may be gathered from the IoT device only periodically. Intermediate information may include complementary health information such as latency and bandwidth and complementary information received from sensors. The tier 3 complete columns represent more detailed information that could be gathered from the device only rarely. Tier 3 information may include detailed health information such as detailed use of memory and processor and detailed information received from sensors.

Processing proceeds to step 610, where the system executes ML model to define the frequency for retrieving data. The system dynamically determines the frequency of data capture from the IoT device based on a known capacity and performance of the device. Depending on device type and the criticality of monitoring performed by the device, the history of system data readings, the compromise among performance indicators, a frequency for data retrieval is defined via ML model for the device to be sensitized, during operation, and provide required status information. In order to define this frequency, the limitations of the device in terms of processing capacity is respected, thus avoiding a compromise of normal operating characteristics. The type of data generated is defined during a device detection step. With the initial frequency defined by an SME and based on reinforcement learning techniques, the ML model allows the system to understand device behavior to create references for the device and check the behavior against the knowledge base having historic records for similar devices.

As reinforcement learning techniques such as Q-learning and deep Q-network algorithms are used to learn quality of actions to instruct an agent what action to take under what circumstances. Q-learning determines an optimal policy in the sense of maximizing the expected value of the total reward over any and all successive steps, starting from the current state of a device. Deep Q-network is used for experience replay, a biologically inspired mechanism that uses a random sample of prior actions instead of the most recent action to proceed. This removes correlations in the observation sequence and smooths changes in the data distribution.

In that way, depending on behavior deviation of any regular characteristic of the device, the frequency of data retrieval is adjusted and reduced automatically as well as defining any additional data to be collected in order to confirm potential anomalies. At the same time, for additional data collection, the ML model respects devices limitations so as not to stress the device performance, which typically occurs in case of bad functions.

For both techniques, Q-learning and deep Q-network, in terms of input data, there must be considered the same data used at step 34 including: (i) Device metadata (name, model, version, ID, hardware version, software/firmware version); (ii) Device Capabilities; (iii) Data (information itself); (iv) Device limitations, data transfer bandwidth/latency, battery capability, and computing power, device date and contextual usage; and (v) Eventual anomalies.

As the output data is generated at the desired frequency based on the Q-learning and deep Q-network process combination, a new time interval is established in order for new data to be captured and analysis of the data for possible anomaly detection to be completed. For example, if a device produces anomalous data, the memory usage of the device may be affected such that the usage exceeds a regular measurement range. If the typical memory usage is on average about 50% and the peak usage is around 90-100%, fewer additional data retrievals are performed in short time intervals while confirming the detected anomaly. At the same time, if the operation for data retrieval does not respond due an overload on the IoT device, the anomaly is automatically assumed and indicated to the anomaly detection system.

Processing proceeds to step 612, where the system returns a specific retrieval frequency and a specified quantity of data to be retrieved during a specified interval. The results generated at steps 608 (amount of data) and 610 (specified frequency) are returned to the anomaly detection system after the following step.

Figure 7:
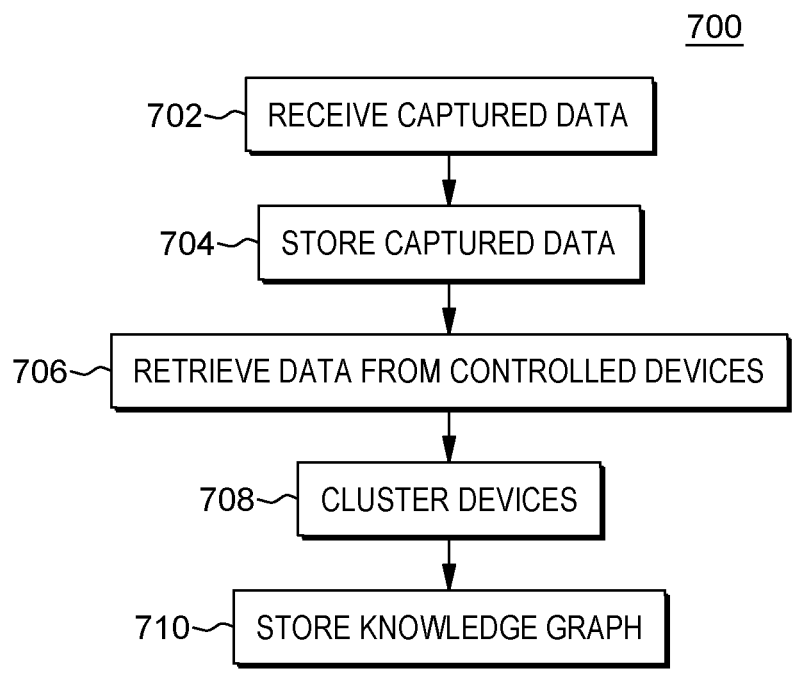
FIG. 7 is a flowchart showing a third method performed, at least in part, by the second embodiment system.

Some embodiments of the present invention will now be described in detail with reference to FIG. 7, which shows flowchart 700 depicting a third method according to the present invention. FIG. 4 shows computing system 400 for performing at least some of the method steps of flowchart 700. This method and associated software/hardware will now be discussed, over the course of the following paragraphs, with extensive reference to FIG. 7 (for the method step blocks) and FIG. 4 (for the computing system).

Processing proceeds to step 702, where the system receives captured data from the IoT devices. The input data includes all data available captured from each device.

Processing proceeds to step 704, where the system stores captured data in the knowledge base. This step stores the last-captured data into a knowledge base.

Processing proceeds to step 706, where the system retrieves data from all the controlled devices. All data of each controlled device is loaded for feeding a K-means model.

Processing proceeds to step 708, where the system executes an ML model to cluster devices according to characteristics, behaviors, and context of the clustered devices. The system uses an unsupervised machine learning algorithm to setup the knowledge graph relationship among the various IoT devices based on their behaviors, types, and/or characteristics.

For this reason, the device information is gathered for all similar devices to use as features of the ML training including: (i) Device metadata (name, model, version, ID, hardware version, software/firmware version); (ii) Device Capabilities; (iii) Data (information itself); (iv) Device limitations, data transfer bandwidth/latency, battery capability, and computing power, device date and contextual usage; and (v) Eventual anomalies. The outcome from the K-means algorithm is that devices are clustered according to common behaviors and environment.

Processing proceeds to step 710, where the system stores the knowledge graph into the knowledge base. The updated knowledge graph is stored on knowledge base.

Some embodiments of the present invention assume that the IoT devices have embedded agents to provide information to the disclosed method. In order to not damage the functionality of an IoT device while detecting a possible anomaly, some embodiments of the present invention leverage an agnostic approach for probing by assuming that the IoT device has embedded management information capabilities such as MIB II so no agent install is required.

According to some embodiments of the present invention a knowledge base is a database to store information of all IoT devices being monitored including: (i) metadata information, (ii) data captured from devices, (iii) historical data, (iv) eventual anomalies, and (v) the knowledge graph.

According to some embodiments of the present invention a model repository stores all the machine learning models that may be used when practicing embodiments of the present invention.

Some embodiments of the present invention are directed to considering device limitations including, but not limited to: (i) data transfer bandwidth; (ii) data transfer latency; (iii) battery capability or capacity; and (iv) computing power. Further, some embodiments of the present invention are directed to considering device features and contextual usage when automatically learning what data retrieval frequency and what quantity of data should be retrieved in order to detect device anomalies. The learning is performed via a combination of supervised machine learning and reinforcement learning. Some embodiments of the present invention use unsupervised machine learning and a knowledge graph to recognize multiple devices sharing similar features and deployment environments so that training may be accelerated in learning the amount and frequency of data to be retrieved from a particular device.

Some embodiments of the present invention are directed to a computer-implemented method for a data retrieval controller, the computer-implemented method including: (i) in response to invocation of a system detecting, for each target device connected to a network, capabilities and characteristics of a respective target device to determine configuration information including processing and memory capabilities; (ii) in response to receiving metadata associated with the target device including name, model, version, identifier, hardware version, software/firmware version, device data model and device capabilities, analyzing features of other devices sharing similar features and deployment environments using information retrieved from a knowledge database to form analyzed results; (iii) storing the analyzed results as a knowledge graph; (iv) receiving for each target device information including device limitations, data transfer bandwidth/latency, battery capability, computing power, device date, contextual usage, last captured data, historical data, configuration and historical anomalies; (v) executing a previously trained predetermined first machine learning model defining an amount of data to be retrieved using information including device characteristics, capabilities, health metrics to determine tiers of data as a quantity of data to be captured in a next iteration; (vi) executing a previously trained predetermined second machine learning model defining a frequency on which to retrieve data from the target device, using information associated with a respective capacity and performance of a respective target device; (vii) in response capturing data using parameters of the amount of data to be retrieved and defined frequency on which to retrieve the data, storing analyzed data using predetermined criteria in the knowledge base for use by a continuous learning mechanism; (viii) iteratively updating the knowledge base with information including device clusters represented in the knowledge graph using respective metadata and captured data for each metric available; (ix) analyzing updated information in the knowledge base using predetermined anomaly analysis techniques, including analysis of events related to safety, inadequacy or incoherent functioning to form analyzed updated information; (x) in response to determining an anomaly is detected, storing anomaly information in a data repository for use with a learning mechanism in next executions; and (xi) sending a notification to an external specialized system for event handling.

Some embodiments of the present invention are directed to automatically adapting, through a machine learning mechanism, the data retrieval frequency, the amount of data, and type of data to be retrieved from a device in such a way as to make the device deliver an expected amount of data to an application according to an SLA while serving an external anomaly detection system. One important point to highlight is that the automatic re-adjustment of how the data is collected to serve both the anomaly detection system and the application consuming the IoT device data removes the need to add rules manually for such re-adjustments. In addition, some embodiments of the present invention allow the reuse of such knowledge via a knowledge graph that takes advantage of similarities among devices and their contextual deployment.

Some embodiments of the present invention are directed to retrieving specific kinds of device data based on the device type. Automatic and dynamic adaptation of the frequency, amount, and type of data to be collected from a device such that the device delivers the amount of data to an application required by an SLA while properly serving an external anomaly detection system. Further, reuse of such knowledge about various devices is expressed via a knowledge graph that aligns devices by feature similarities and contextual deployment similarities.

Some embodiments of the present invention are directed to a data retrieval controller that adjusts the amount, frequency, and type of data retrieved from a device by automatically and dynamically balancing demands between (i) required performance defined by an SLA with respect to a receiving application; and (ii) quality of the data delivered to an anomaly detection system.

Some embodiments of the present invention are directed to responding to receiving metadata associated with the target device including name, model, version, identifier, hardware version, software/firmware version, device data model and device capabilities, by analyzing features of other devices sharing similar features and deployment environments using information retrieved from a knowledge database to form analyzed results.

Figure 8:
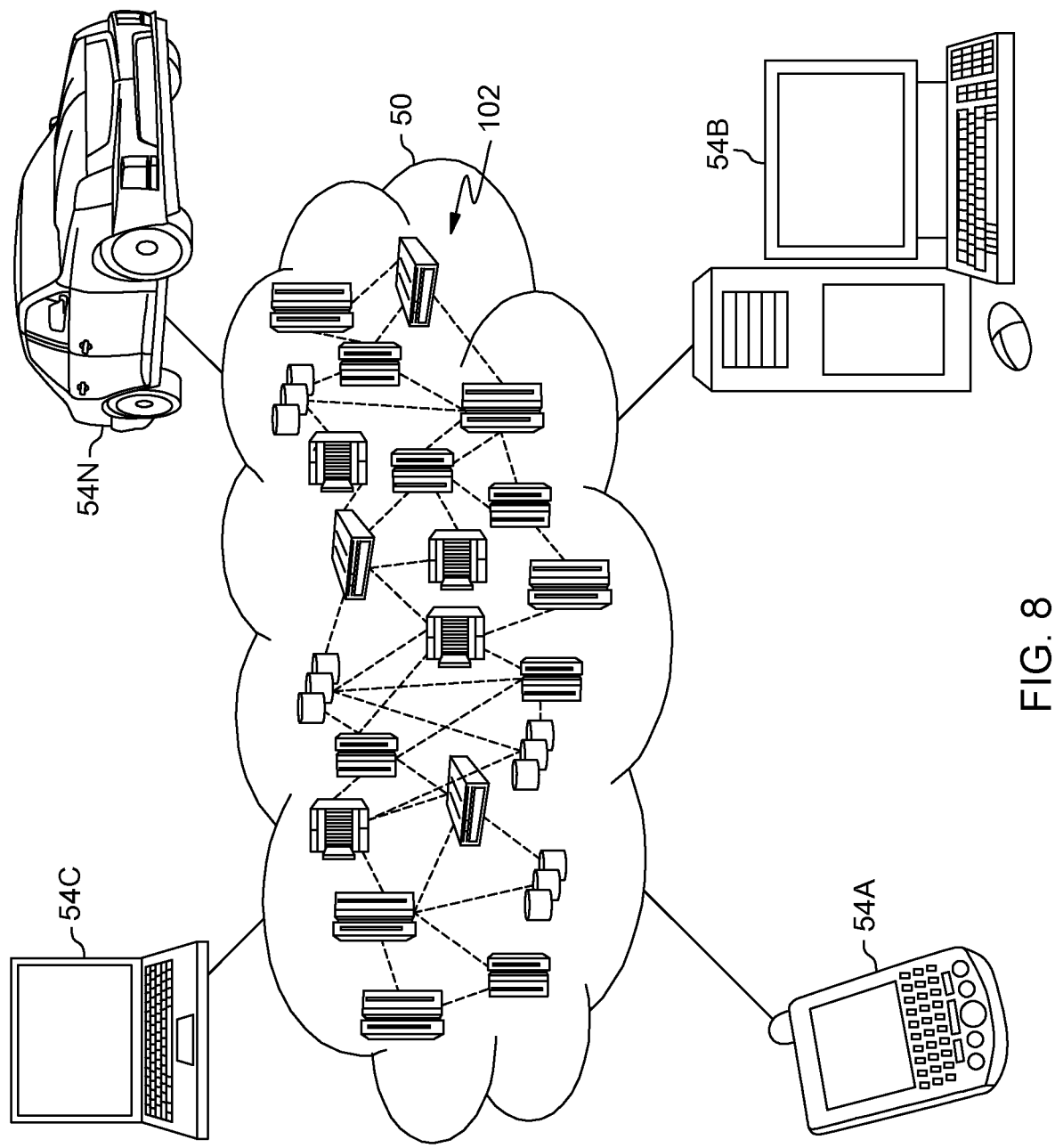
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes, such as data retrieval control sub-system 102 (FIG. 1) and data retrieval controller 408 (FIG. 4), with which local computing devices used by cloud consumers, such as, for example, personal digital assistant (PDA) or cellular telephone 54A, desktop computer 54B, laptop computer 54C, and/or automobile computer system 54N may communicate. The nodes may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that the computing nodes and cloud computing environment 50 can communicate with any type of computerized device over any type of network and/or network addressable connection (e.g., using a web browser).

Figure 9:
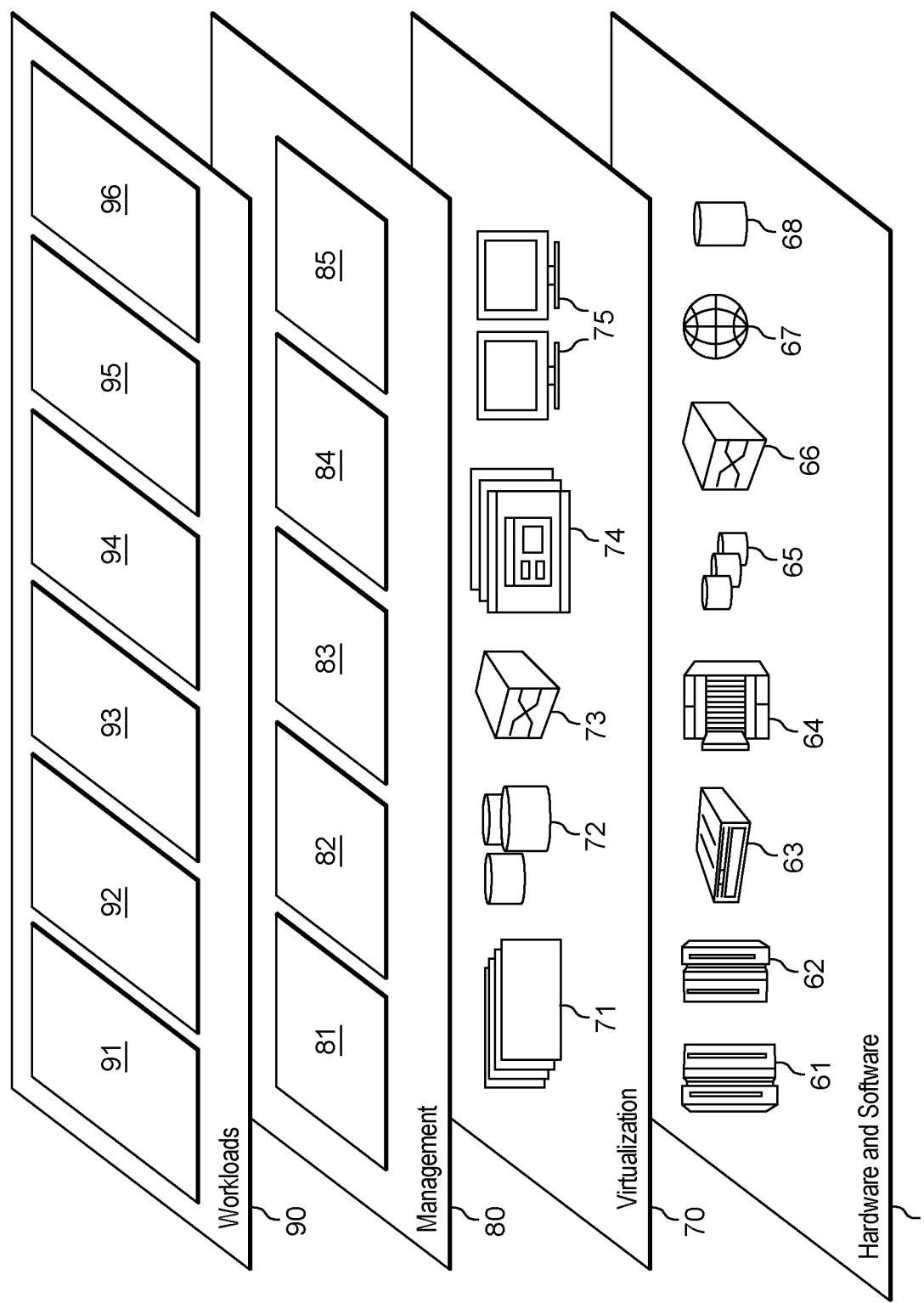
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application-specific record replication processing 96.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
    identifying a set of devices in a knowledge base, the set of devices having a same characteristic as a first device, the first device being a network-connected device transmitting data to a client device;
    defining an amount of data to retrieve from the first device for use by an anomaly detection system based on a set of performance requirements of the first device and usage data of the set of devices, defining the amount of data including:
        running a supervised machine learning model using tiers-of-data labels representing amounts of data to be retrieved; and
        determining a tier of data of the first device according to the supervised machine learning model, wherein the tier of data is the amount of data to be retrieved from the first device;
    defining a frequency for retrieving the amount of data from the first device based on a set of performance requirements of the first device and usage data of the set of devices;
    monitoring for compliance of the first device to the set of performance requirements while transmitting data to the client device while the first device operates according to the defined frequency of data retrieval and the defined amount of data to be retrieved for the anomaly detection system; and
    responsive to compliance to the set of performance requirements being detected, recording to the knowledge base the first device, characteristics of the first device including the same characteristic, the amount of data, and the frequency of data retrieval.

2. The method of claim 1, wherein the same characteristic is type of data collected.

3. The method of claim 1, wherein the connected device is an internet-of-things (IoT) device.

4. The method of claim 1, further comprising:
    determining the set of performance requirements of the first device with reference to a corresponding service level agreement (SLA) for use of the first device.

5. The method of claim 1, further comprising:
updating a knowledge graph by associating the first device with the set of devices based on the first device and the set of devices having the same characteristic;
wherein:
the knowledge graph includes device information stored in the knowledge base.

6. The method of claim 1, wherein the step of defining the frequency for retrieving the amount of data from the first device includes:
executing a machine learning model for the first device to define a frequency of data retrieval as a compromise among performance indicators;
wherein:
an initial frequency is pre-defined; and
the machine learning model operates to check detected behaviors of the first device during operation against historic records for the set of devices in the knowledge base.

7. A computer program product comprising a non-transitory computer-readable storage medium having a set of instructions stored therein which, when executed by a microprocessor, causes the microprocessor to perform:
identifying a set of devices in a knowledge base, the set of devices having a same characteristic as a first device, the first device being a network-connected device transmitting data to a client device;
defining an amount of data to retrieve from the first device for use by an anomaly detection system based on a set of performance requirements of the first device and usage data of the set of devices, defining the amount of data including:
running a supervised machine learning model using tiers-of-data labels representing amounts of data to be retrieved; and
determining a tier of data of the first device according to the supervised machine learning model, wherein the tier of data is the amount of data to be retrieved from the first device;
defining a frequency for retrieving the amount of data from the first device based on a set of performance requirements of the first device and usage data of the set of devices;
monitoring for compliance of the first device to the set of performance requirements while transmitting data to the client device while the first device operates according to the defined frequency of data retrieval and the defined amount of data to be retrieved for the anomaly detection system; and
responsive to compliance to the set of performance requirements being detected, recording to the knowledge base the first device, characteristics of the first device including the same characteristic, the amount of data, and the frequency of data retrieval to.

8. The computer program product of claim 7, wherein the same characteristic is type of data collected.

9. The computer program product of claim 7, wherein the connected device is an internet-of-things (IoT) device.

10. The computer program product of claim 7, further causing the microprocessor to perform a method comprising:
determining the set of performance requirements of the first device with reference to a corresponding service level agreement (SLA) for use of the first device.

11. The computer program product of claim 7, further causing the microprocessor to perform a method comprising:
updating a knowledge graph by associating the first device with the set of devices based on the first device and the set of devices having the same characteristic;
wherein:
the knowledge graph includes device information stored in the knowledge base.

12. A computer system comprising:
a microprocessor set; and
a non-transitory computer readable storage medium;
wherein:
the microprocessor set is structured, located, connected, and/or programmed to run program instructions stored on the computer readable storage medium; and
the program instructions which, when executed by the microprocessor set, cause the microprocessor set to perform:
identifying a set of devices in a knowledge base, the set of devices having a same characteristic as a first device, the first device being a network-connected device transmitting data to a client device;
defining an amount of data to retrieve from the first device for use by an anomaly detection system based on a set of performance requirements of the first device and usage data of the set of devices, defining the amount of data including:
running a supervised machine learning model using tiers-of-data labels representing amounts of data to be retrieved; and
determining a tier of data of the first device according to the supervised machine learning model, wherein the tier of data is the amount of data to be retrieved from the first device;
defining a frequency for retrieving the amount of data from the first device based on a set of performance requirements of the first device and usage data of the set of devices;
monitoring for compliance of the first device to the set of performance requirements while transmitting data to the client device while the first device operates according to the defined frequency of data retrieval and the defined amount of data to be retrieved for the anomaly detection system; and
responsive to compliance to the set of performance requirements being detected, recording to the knowledge base the first device, characteristics of the first device including the same characteristic, the amount of data, and the frequency of data retrieval to.

13. The computer system of claim 12, wherein the same characteristic is type of data collected.

14. The computer system of claim 12, wherein the connected device is an internet-of-things (IoT) device.

15. The computer system of claim 12, further causing the microprocessor to perform a method comprising:
determining the set of performance requirements of the first device with reference to a corresponding service level agreement (SLA) for use of the first device.

16. The computer program product of claim 7, further causing the microprocessor to perform a method comprising:
updating a knowledge graph by associating the first device with the set of devices based on the first device and the set of devices having the same characteristic;
wherein:
the knowledge graph includes device information stored in the knowledge base.

17. The computer program product of claim 7, wherein defining the frequency for retrieving the amount of data from the first device includes:
- executing a machine learning model for the first device to define a frequency of data retrieval as a compromise among performance indicators;
- wherein:
- an initial frequency is pre-defined; and
- the machine learning model operates to check detected behaviors of the first device during operation against historic records for the set of devices in the knowledge base.

18. The computer system of claim 12, wherein defining the frequency for retrieving the amount of data from the first device includes:
- executing a machine learning model for the first device to define a frequency of data retrieval as a compromise among performance indicators;
- wherein:
- an initial frequency is pre-defined; and
- the machine learning model operates to check detected behaviors of the first device during operation against historic records for the set of devices in the knowledge base.

* * * * *